United States Patent
Turner et al.

(10) Patent No.: US 11,031,845 B2
(45) Date of Patent: Jun. 8, 2021

(54) PRESSURE RELIEF SYSTEMS FOR GENERATORS

(71) Applicant: Hamilton Sundstrand Corporation, Charlotte, NC (US)

(72) Inventors: Douglas J. Turner, Rockford, IL (US); Glenn C. Lemmers, Jr., Loves Park, IL (US); David S. Behling, Belvidere, IL (US); Andrew P. Grosskopf, Rockford, IL (US); Nathan D. Kohnle, Rockford, IL (US); Andrew D. Smith, Rock Island, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 165 days.

(21) Appl. No.: 16/146,960

(22) Filed: Sep. 28, 2018

(65) Prior Publication Data
US 2020/0106340 A1    Apr. 2, 2020

(51) Int. Cl.
*H02K 9/02* (2006.01)
*F16K 17/04* (2006.01)
*H02K 7/00* (2006.01)
*F01D 15/10* (2006.01)

(52) U.S. Cl.
CPC .............. *H02K 9/02* (2013.01); *F16K 17/048* (2013.01); *H02K 7/003* (2013.01); *F01D 15/10* (2013.01); *H02K 2205/09* (2013.01)

(58) Field of Classification Search
CPC ...... H02K 9/02; H02K 2205/09; H02K 7/003; F16K 17/048; F01D 15/10

USPC .......................................................... 310/58
See application file for complete search history.

(56) References Cited

U.S. PATENT DOCUMENTS

| | | | |
|---|---|---|---|
| 7,372,175 B2* | 5/2008 | Bouiller | F01D 15/10 290/52 |
| 10,056,805 B2* | 8/2018 | Behling | H02K 5/12 |
| 10,100,924 B2* | 10/2018 | Schiele | F16H 61/0283 |
| 2017/0098978 A1* | 4/2017 | Behling | H02K 5/12 |
| 2018/0135434 A1* | 5/2018 | Hall | E21B 4/02 |
| 2020/0106340 A1* | 4/2020 | Turner | H02K 9/02 |

FOREIGN PATENT DOCUMENTS

EP    3157147 A1    4/2017

OTHER PUBLICATIONS

Extended European search report issued in corresponding EP application No. 19199831.9, dated Feb. 5, 2020.

* cited by examiner

*Primary Examiner* — Forrest M Phillips
(74) *Attorney, Agent, or Firm* — Locke Lord LLP; Scott D. Wofsy; Gabrielle L. Gelozin

(57) ABSTRACT

A system for relieving pressure from within a generator casing can include a generator shaft defining a shaft channel therein and at least one rotating valve disposed within the shaft channel of the generator shaft and in fluid communication with an interior of the generator casing and the atmosphere. The rotating valve is configured to allow fluid within the generator casing to flow through the generator shaft to the atmosphere in an open state and while rotating. The rotating valve is configured to prevent fluid within the generator casing from flowing in a closed state.

17 Claims, 2 Drawing Sheets

PRESSURE RELIEF SYSTEMS FOR GENERATORS

BACKGROUND

1. Field

The present disclosure relates to electrical generators, e.g., to variable frequency generators (VFGs).

2. Description of Related Art

High speed generators (e.g., for aircraft) use a liftoff seal which, as a result of the function of the seal, pump air into the generator casing. This increases the case pressure of the generator. On certain generator application, the case pressure can increase enough to actuate a stationary case pressure relief valve (CPRV) installed in the casing. Actuation of the CPRV during operation will result in a loss of circuit oil from the casing during operation (e.g., because the air bled through the CPRV includes oil mist).

Such conventional methods and systems have generally been considered satisfactory for their intended purpose. However, there is still a need in the art for improved pressure relief/regulating systems for generators. The present disclosure provides a solution for this need.

SUMMARY

A system for relieving pressure from within a generator casing can include a generator shaft defining a shaft channel therein and at least one rotating valve disposed within the shaft channel of the generator shaft and in fluid communication with an interior of the generator casing and the atmosphere. The rotating valve is configured to provide a passage within the generator casing to flow air through the generator shaft to the atmosphere in an open state and while rotating. The rotating valve is configured to prevent fluid within the generator casing from flowing in a closed state.

The valve can be a check valve configured to transition from the closed state to the open state when a pressure differential between the generator casing and the atmosphere exceeds a predetermined threshold. Any other suitable valve type is contemplated herein.

The system can further include a separator disposed within the casing upstream of the rotating valve. The separator can be configured to aid in the separation of the oil from air.

In certain embodiments, the generator shaft can include one or more oil collection apertures upstream of the rotating valve and configured to route oil separated from air due to centrifugal force away from the valve. The shaft can include one or more relief holes defined through the generator shaft. The shaft channel can be in fluid communication with the atmosphere via the one or more relieve holes.

The one or more relief holes can be disposed in a shaft end coupling, for example, or in any other suitable location. The one or more relief holes can extend radially outward from the shaft channel and can be angled axially toward the casing.

In accordance with at least one aspect of this disclosure, a generator shaft for relieving pressure within a generator casing can include a shaft channel defined therein, and at least one rotating valve as described herein. Any other suitable features for a generator shaft, e.g., as described above, are contemplated herein.

In accordance with at least one aspect of this disclosure, a generator can include a casing and a generator shaft disposed at least partially within the casing. The generator can include at least one rotating valve disposed within the shaft channel of the generator shaft as disclosed herein. The generator can be a variable frequency generator, e.g., for an aircraft, or any other suitable generator type (e.g., variable speed constant frequency (VSCF) or a high speed AGEN).

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 2:
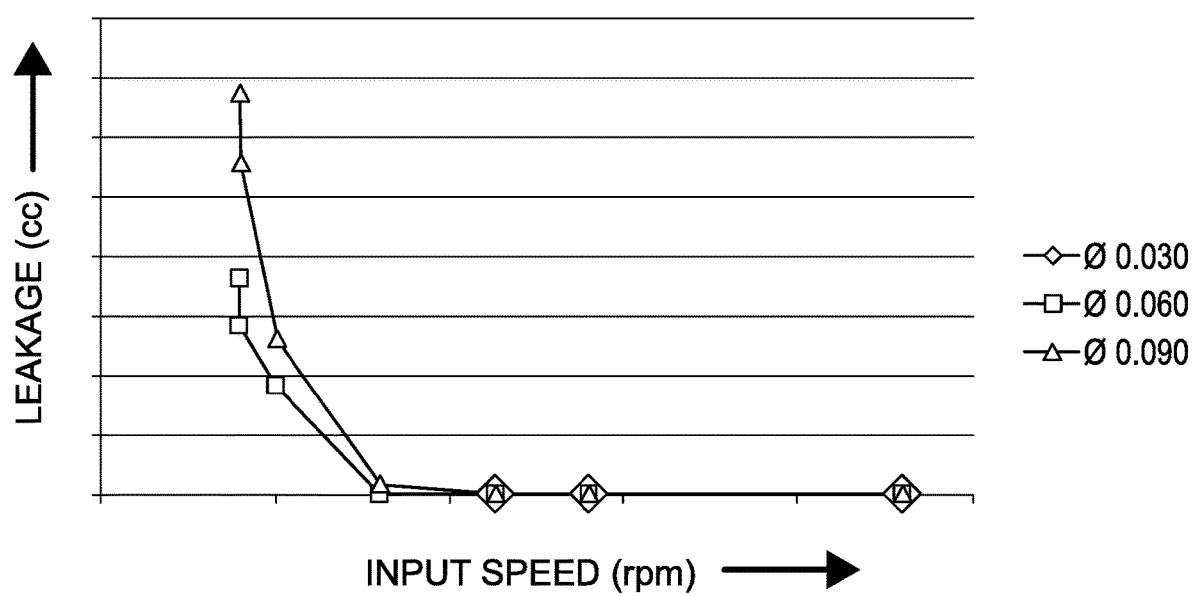
FIG. 2 is a chart of oil leakage as a function of operational speed and valve orifice size.

Reference will now be made to the drawings wherein like reference numerals identify similar structural features or aspects of the subject disclosure. For purposes of explanation and illustration, and not limitation, an illustrative view of an embodiment of a generator in accordance with the disclosure is shown in FIG. 100 and is designated generally by reference character 100. Other embodiments and/or aspects of this disclosure are shown in FIG. 2.

Figure 1:
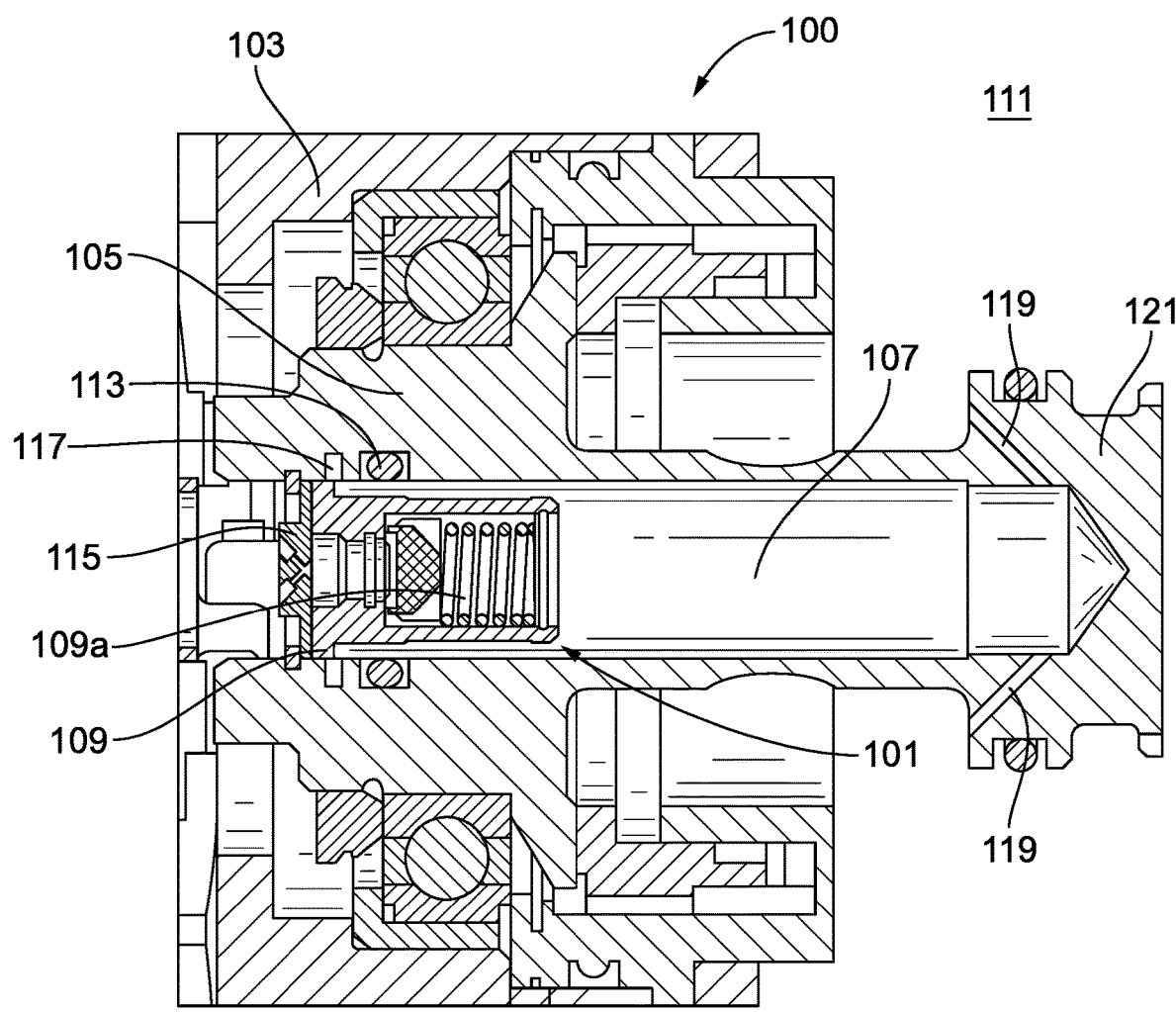
FIG. 1 is a partial cross-sectional view of an embodiment of a generator in accordance with this disclosure, showing a system in accordance with this disclosure.

Referring to FIG. 1, a system 101 for relieving pressure from within a generator casing 103 of a generator 100 can include a generator input shaft 105 defining a shaft channel 107 therein, and at least one rotating valve 109 disposed within the shaft channel 107 of the generator input shaft and in fluid communication with an interior of the generator casing 103 and the atmosphere 111. The rotating valve 109 is configured to allow fluid within the generator casing 103 to flow through the generator input shaft 105 to the atmosphere 111 in an open state and while rotating. The rotating valve 109 is configured to prevent fluid within the generator casing 103 from flowing in a closed state.

The valve 109 can be a check valve, e.g., as shown, configured to transition from the closed state to the open state when a pressure differential between the interior of generator casing 103 and the atmosphere 111 exceeds a predetermined threshold. For example, the valve 109 can include a suitable spring member 109a sized to provide closing force up to the predetermined pressure differential threshold.

In certain embodiments, the valve 109 can be a regulating valve to regulate pressure, for example. Any other suitable mechanical valve type is contemplated herein.

The valve 109 can be sealed within the shaft channel 107 using a seal 113. The seal 113 can be an o-ring or any other suitable seal.

The system 101 can further include a separator 115 disposed within the input shaft 105 upstream of the rotating valve 109 and/or the shaft channel 107. The separator 115 can be configured to separate oil from air, for example.

In certain embodiments, the generator input shaft 105 can include one or more oil collection apertures 117 upstream of the rotating valve 109. The one or more oil collection apertures 117 can be configured to retain oil separated from air due to centrifugal force, for example.

The oil collection apertures 117 can be defined on an inner diameter of the input shaft 105, e.g., within the shaft channel 107 upstream of the valve 109. Any other suitable location is contemplated herein. The one or more apertures 117 can be ported to the interior of the casing 103, e.g., via a port (not shown) defined in the input shaft 105 (e.g., which can guide oil at least partially radially outward or otherwise away from the aperture 117).

The input shaft 105 can include one or more relief holes 119 defined through the generator input shaft 105. The one or more relief holes 119 are downstream of the rotating valve 109, for example. The shaft channel 107 can be in fluid communication with the atmosphere 111 via the one or more relieve holes 119.

The one or more relief holes 119 can be disposed in the input shaft 105, for example, or in any other suitable location which would port the air flow to the atmosphere 111. The one or more relief holes 119 can extend radially outward from the shaft channel 107 and can be angled axially toward the exterior of the casing 103 as shown. Any other suitable configuration is contemplated herein.

In accordance with at least one aspect of this disclosure, a generator input shaft 105 for relieving pressure within a generator casing 103 can include a shaft channel 107 defined therein, and at least one rotating valve 109, e.g., as described above. Any other suitable features for a generator shaft, e.g., as described above, are contemplated herein.

In accordance with at least one aspect of this disclosure, a generator 100 can include a casing 103 and a generator input shaft 105 disposed at least partially within the casing 103. The generator 100 can include at least one rotating valve 109 disposed within the shaft channel of the generator input shaft as disclosed herein. The generator 100 can be a variable frequency generator, e.g., for an aircraft, or any other suitable generator type (e.g., variable speed constant frequency (VSCF) or a high speed AGEN). Any suitable embodiment for the generator 100, the input shaft 105, and/or the valve 109, e.g., as described above is contemplated herein.

Lift seals create an air barrier, but such seals also force in air into the generator casing. In certain cases, e.g., in high speed generators, it can force in enough air to build the case pressure enough to open a pressure valve in the casing, which releases case pressure, but the bled air can include oil (e.g., oil mist). Embodiments solve this by including at least one valve in the shaft where oil will be urged outwardly during use due to rotation such that only air will be bled in sufficiently high speed operation, (e.g., when connected to a turbomachine in flight).

Embodiments avoid oil loss. As shown in FIG. 2, the embodiments show no leakage within normal speed operation. Oil that separates can be collected in collection apertures, e.g., as disclosed above, and be ported to the interior of the generator casing.

Embodiments utilize a casing pressure relief valve (CPRV) which is located within the rotating input shaft. When embodiments actuate during operation (e.g., high speed rotation), the centrifugal action can separate the oil and air so only air evacuates during an actuation of the valve to release case pressure. The existing approach uses a stationary CPRV which loses oil during actuation resulting in the need for more frequent maintenance actions or unit removal. Embodiments actuate and reduce pressure without oil loss. Embodiments can provide a more reliable generator. In certain embodiments, the rotating valve can replace the existing CPRV in the casing and cost less than existing case pressure regulating design hardware.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system for relieving and/or regulating pressure from within a generator casing, comprising:
   a generator input shaft defining a shaft channel therein; and
   at least one rotating valve disposed within the shaft channel of the generator input shaft and in fluid communication with an interior of the generator casing and the atmosphere,
   wherein the rotating valve is configured to allow fluid within the generator casing to flow through the generator input shaft to the atmosphere in an open state and while rotating, wherein the generator shaft includes one or more oil collection apertures upstream of the rotating valve and configured to retain oil separated from air due to centrifugal force, wherein the one or more oil collection apertures are ported to the interior of the casing via a port defined in the input shaft to guide oil at least partially radially outward from the aperture, and
   wherein the rotating valve is configured to prevent fluid within the generator casing from flowing in a closed state, wherein the rotating valve is an axially moving check valve configured to transition from the closed state to the open state when a pressure differential between the generator casing and the atmosphere exceeds a predetermined threshold.

2. The system of claim 1, wherein the axially moving check valve includes a spring member sized to provide closing force up to the predetermined pressure differential threshold.

3. The system of claim 1, further comprising a separator disposed within the casing upstream of the rotating valve, the separator configured to separate oil from air.

4. The system of claim 1, further comprising one or more relief holes defined through the generator shaft, wherein the shaft channel is in fluid communication with the atmosphere via the one or more relieve holes.

5. The system of claim 4, wherein the one or more relief holes are disposed in the input shaft.

6. The system of claim 5, wherein the one or more relief holes extend radially outward from the shaft channel and are angled axially toward a casing exterior.

7. A generator shaft for relieving pressure within a generator casing, comprising
- a shaft channel defined therein; and
- at least one rotating valve disposed within the shaft channel of the generator input shaft and in fluid communication with an interior of the generator casing and the atmosphere,
- wherein the rotating valve is configured to allow fluid within the generator casing to flow through the generator input shaft to the atmosphere in an open state and while rotating, wherein the generator shaft includes one or more oil collection apertures upstream of the rotating valve and configured to retain oil separated from air due to centrifugal force, wherein the one or more oil collection apertures are ported to the interior of the casing via a port defined in the input shaft to guide oil at least partially radially outward from the aperture, and
- wherein the rotating valve is configured to prevent fluid within the generator casing from flowing in a closed state, wherein the rotating valve is an axially moving check valve configured to transition from the closed state to the open state when a pressure differential between the generator casing and the atmosphere exceeds a predetermined threshold.

8. The shaft of claim 7, wherein the axially moving check valve includes a spring member sized to provide closing force up to the predetermined pressure differential threshold.

9. The shaft of claim 7, further comprising a separator disposed within the casing upstream of the rotating valve, the separator configured to separate oil from air.

10. The shaft of claim 7, further comprising one or more relief holes defined through the generator input shaft, wherein the shaft channel is in fluid communication with the atmosphere via the one or more relieve holes.

11. The shaft of claim 10, wherein the one or more relief holes are disposed in the input shaft.

12. The shaft of claim 11, wherein the one or more relief holes extend radially outward from the shaft channel and are angled axially toward a casing exterior.

13. A generator, comprising:
- a casing;
- a generator shaft defining a shaft channel therein and disposed at least partially within the casing; and
- at least one rotating valve disposed within the shaft channel of the generator input shaft and in fluid communication with an interior of the generator casing and the atmosphere,
- wherein the rotating valve is configured to allow fluid within the generator casing to flow through the generator shaft to the atmosphere in an open state and while rotating, wherein the generator shaft includes one or more oil collection apertures upstream of the rotating valve and configured to retain oil separated from air due to centrifugal force, wherein the one or more oil collection apertures are ported to the interior of the casing via a port defined in the input shaft to guide oil at least partially radially outward from the aperture, and
- wherein the rotating valve is configured to prevent fluid within the generator casing from flowing in a closed state, wherein the rotating valve is an axially moving check valve configured to transition from the closed state to the open state when a pressure differential between the generator casing and the atmosphere exceeds a predetermined threshold.

14. The generator of claim 13, wherein the axially moving check valve includes a spring member sized to provide closing force up to the predetermined pressure differential threshold.

15. The generator of claim 13, further comprising a separator disposed within the casing upstream of the rotating valve, the separator configured to separate oil from air.

16. The generator of claim 13, further comprising one or more relief holes defined through the generator shaft, wherein the shaft channel is in fluid communication with the atmosphere via the one or more relieve holes.

17. The generator of claim 13, wherein the generator is a variable frequency generator.

\* \* \* \* \*